Patented Sept. 25, 1951

2,569,383

UNITED STATES PATENT OFFICE 2,569,383

POLYMERIC HYDROCARBON DRYING OILS

George F. Leyonmark, Avenel, and Paul E. Hardy, Elizabeth, N. J., assignors to Standard Oil Development Company, a corporation of Delaware No Drawing. Application November 9, 1946, Serial No. 708,947

9 Claims. (Cl. 260—683.15)

This invention relates to novel polymeric materials and to their methods of manufacture and more particularly to the preparation of oily liquids by the copolymerization of mixtures containing a low molecular weight mono-olefin and a polyolefin in the presence of a Friedel-Crafts catalyst; it relates especially to the use of such liquid polymers as drying oils for paints, varnishes, enamels, etc.

It is well known in the art that resinous solids or vulcanizable rubber-like polymers can be prepared by polymerizing suitable mixtures of a diolefin and a mono-olefin. Such polymerizable mixtures are cooled to relatively low temperatures, preferably below −50° C. and even as low as −160° C. or lower in the presence of a diluent-refrigerant such as liquid ethylene or methyl chloride. Polymerization occurs at a fairly rapid rate at these temperatures on addition of a suitable catalyst such as aluminum chloride dissolved in methyl chloride. This process is exemplified for instance by U. S. Patent 2,356,128, issued August 22, 1944. The product is a high molecular weight rubbery polymer characterized by the property that in spite of low unsaturation it can be vulcanized with sulfur or other known agents to produce strongly elastic materials of high mechanical strength and of great chemical inertness.

Non-rubbery, hard resins can also be prepared by polymerizing these monoolefin-diolefin mixtures by a similar procedure, but at higher temperatures, for example, from about +10 to −30° C.

It is the object of our present invention to provide the art with a novel process for producing oily polymers by the copolymerization of monoolefins and polyolefins, under pressure and at slightly superatmospheric temperature. Another object is to obtain drying oils of enhanced properties, inexpensive in cost and simple in technique of preparation. Another particular object is to provide the art with a novel process for polymerizing propylene into valuable drying oils which may be used as such or in paints, varnishes, etc. to yield tough, resistant films when dried in air or oven baked. A further particular object is to eliminate the undesirable formation of insoluble gels during the polymerization. Other objects will appear hereinafter.

Attempts to polymerize propylene have not met with much success up to this time, because propylene, despite substantial chemical resemblance to isobutylene, polymerizes normally at a much lower rate than the latter. In previous attempts, for instance, a mixture of butadiene and propylene was polymerized at atmospheric pressure by bubbling it through aqueous boron fluoride ranging in composition from monohydrate to dihydrate. However, this process was characterized by a very low polymerization rate, low production capacity per reactor volume, and also the product prepared according to this prior method was amber or brown colored. Furthermore, in this process the yield of useful product is often adversely affected by the formation of varying amounts of insoluble gel. Another earlier process of polymerizing propylene was of the low temperature character, required relatively large amounts of powerful catalyst, and yielded quite viscous oils having a molecular weight upward of 2,000.

We have now discovered a new process whereby propylene can be advantageously copolymerized with diolefins in the presence of a Friedel-Crafts catalyst to yield liquid polymers usable as light colored drying oils. This reaction is easily and very rapidly carried out under pressure and at temperatures slightly above atmospheric, and in further distinction from the prior art, no diluent or internal refrigerant need be employed in the polymerization. The resulting oily product is of great value, especially as a drying oil. It can be employed with or without the addition of drying agents or fillers or coloring matter, and is characterized by yielding a quick-baking, heat resistant, tough film which compares favorably with films obtained from far more expensive drying oils.

In practicing the invention the normally gaseous monoolefin is mixed with a diolefin, the mixture being usually condensed by cooling before charging it to a pressure vessel precooled to about −60° C. The proportions of monoolefin to diolefin in the polymerization mixture may be between about 50–70 weight percent of monoolefin and 50–30 weight percent of diolefin. The vessel is then capped, warmed to room temperature, and the gaseous catalyst, boron trifluoride, is introduced under pressure until the heat of reaction, which is indicative of the start of the polymerization reaction, causes a steady rise in bomb pressure in excess of the pressure rise attributable to the volume of catalyst fed. The catalyst is anhydrous, i. e. contains no more than a promotional amount of water. When the reaction has thus been started, the catalyst stream is turned off, and the heat of reaction is allowed to raise the pressure and temperature within the pressure vessel until the reaction has spent itself. If desired, the interdependent temperature and pressure may be controlled during the polymerization by providing the reactor with suitable heat exchange means. A more satisfactory or homogeneous product can be made in this manner.

The product, an oily polymer having a molecular weight within the approximate range of 300 to 1000, is then removed from the bomb, contacted with ammonia, certain amines or other commonly known compounds to absorb or destroy the catalyst, washed, dried and filtered. When desired, the viscosity of the product may be cut back by a diluent to facilitate the finishing operations, adding for instance convenient proportions ranging from about one third to about equal parts by volume of solvent naphtha or any other hydrocarbon solvent having a boiling point within the range of about 100° F. to 300° F. The product quality can be controlled by careful control of temperature and catalyst addition, by variations of ratio and chemical compositions of the monomeric feed, etc. Furthermore, the optional addition of small amounts in the range between about ½ and 10 parts per 100 parts of total monomer, of a third component, like the dimer of isobutylene, to the olefinic feed mixture has a very marked and favorable effect on the polymerization reaction and on the properties of the cured or dried films, as discussed in detail hereinbelow.

In mixed polymerization reactions of the type involved here, troublesome and economically undesirable gel formation is often encountered. Such insoluble gels are due to a preferential polymerization of the polyolefin substantially without its monoolefinic comonomer, and their formation is a function of the ratio of reactants, type of catalyst, etc. We have now discovered that this gel formation can be greatly reduced by the addition to the principal olefinic comonomers of a polymerizable, mutually soluble hydrocarbon component such as a liquid polymer of isobutylene or the like, especially dimer or trimer of isobutylene. Such addition of liquid polymer is beneficial not only in reducing the amount of undesirable gel, especially in mixtures of high polyolefin content, but also the properties of the cured or dried films obtained from the oily product are thereby improved. Furthermore, by thus making it possible to polymerize mixtures possessing a very high polyolefin/monoolefin ratio, an unusually reactive oil may thus be prepared.

The use of normally solid Friedel-Crafts catalysts like aluminum chloride or bromide causes extensive formation of the said insoluble gel. In contrast thereto we have found that gaseous boron fluoride, used in amounts ranging from about 1% to 10% by weight of the polymerizable feed materials is much more propitious than the said solid catalysts in keeping down the conversion of monomer into the insoluble gel while causing a rapid formation of the desired soluble copolymer.

The preferred mono-olefin is propylene, but 1-butene, 2-butene, 2-methyl propene, amylenes or any olefin possessing 3 to 5 carbon atoms per molecule or a mixture thereof can also be used. Conjugated diolefins having 4 to 6 carbon atoms per molecule such as butadiene, isoprene, dimethyl butadiene, pentadiene-1,3, or other conjugated or non-conjugated polyolefins having from 4 to about 10 or 12 carbon atoms per molecule such as pentadiene-1,4, hexatriene, myrcene and the like are suitable as comonomers; unsubstituted or methyl substituted butadienes being preferred. The ratio of mono-olefin to polyolefin may be varied in the feed from about 4:1 to about 1:2 parts by weight and the monomeric ingredients may be mixed in gaseous or liquid form. The monomeric mixture may be diluted by inert components which will not take part in the reaction.

The addition of dimer of isobutylene in amounts ranging from a trace to about 10% by weight based on the total amount of polymerizable materials present, is also advantageous for the reasons stated above. Conversion may be carried out to the extent of about 70 to 99% of the polymerizable reactants present, the product consisting predominantly of a soluble oily polymer with small amounts of insoluble gel. The precooling of the vessel before charging the volatile polymerization materials is advantageous when operating in a batch system in its simplest form, but can be dispensed with by providing suitable alternative charging mechanism.

The gaseous boron fluoride catalyst is introduced under pressure, preferably about 50 pounds per square inch in excess of the vapor pressure existing in the bomb at room temperature. The operating pressure may lie anywhere in the range between about 50 to 2000 lbs./sq. in., but 200 to 600 lbs./sq. in. was found to be most advantageous. The reaction temperatures may range between +10° C. and about +150° C., preferably between 50° C. and 110° C.

At the end of the reaction, that is some 15 minutes to 18 hours after the start of the reaction, usually after about 30 minutes to 2 hours, the pressure in the reactor is released and the product removed. When it is desired to increase the fluidity of the oily product, diluents may be added at this stage. The following materials are suited for diluents: Aliphatic hydrocarbons such as hexane, solvent naphtha or similar fluid hydrocarbons; cyclic hydrocarbons such as benzene, decalin, toluene, and other alkylated aromatics; or halogenated hydrocarbons such as carbon tetrachloride, methyl chloride, bromoform, etc., may be used. The oily polymer, diluted or undiluted, is then treated in the usual manner, for instance with ammonia, certain amines or other substances to absorb or destroy the catalyst, water washed, dried, and filtered through clay.

When desired, this treated product can be diluted with any of the suitable diluents at this stage, or, alternatively, if a diluent had previously been added it may be stripped off, to vary the viscosity of the oily product to any range desirable for handling or final use. The conventional drying agents such as naphthenates of lead, manganese, or cobalt, or the like may be added, as well as pigments and inert fillers.

The following specific examples illustrate the present invention, it being understood of course that other embodiments of this invention are possible without departing from the inventive concept herein disclosed. Thus for instance it is obvious that while all examples illustrate a batch process, the polymer may be prepared continuously by continuously introducing the proper feed of catalyst and monomeric mixture and continuously withdrawing the formed polymer from the reactor under pressure.

EXAMPLE 1

60 parts by weight of propylene and 40 parts by weight of butadiene were charged to a 3-liter pressure vessel precooled to −60° C. The vessel was capped and warmed to room temperature. Boron fluoride gas was introduced under pressure, approximately 100 lbs./sq. in. in excess of the vapor pressure in the bomb at room temperature until a steady rise in bomb pressure indicated that the reaction was under way. The temperature thereafter rose to a maximum of 85° C., accompanied by a maximum pressure of 680 lbs./sq. in. At the end of 1.25 hours the polymerization was substantially complete. The pressure was released, the oily polymer diluted with an equal volume of solvent naphtha, treated with ammonia, water washed, dried over calcium sulphate and clay filtered. Thereafter the solvent was stripped by distillation. By this operation 80% of the monomers were converted into a soluble oily polymer and 10% was in the form of an insoluble gel.

EXAMPLE 2

The same procedure was followed as in Example 1 except that the charge consisted of 57.3 parts of propylene, 38.2 parts of butadiene and 4.5 parts of isobutylene dimer. In this case the temperature rose within 1.5 hours to a maximum of 65° C., the pressure rose to 400 lbs./sq. in. and the reactants were converted as follows: 80% of soluble liquid polymer, possessing a molecular weight of 385, and only a trace of insoluble gel.

These and other modifications carried out in analogous fashion are summarized in Table I, it being noted that the propylene-isoprene mixture of Example 9 and the butadiene-butene-2 mixture of Example 10 gave products closely resembling the copolymer of propylene with butadiene.

at room temperature or baked at different temperatures for varying lengths of time.

Soap, water and grease resistance, comparative hardness, flexibility, and color of the dried or baked films were determined subsequently as follows:

*Soap resistance.*—A small piece of "Ivory" soap (essentially a sodium soap) was left in wet contact with the dry film for two hours.

*Water resistance.*—A spot of water was left in contact with the dry film for five hours.

*Grease resistance.*—A small portion of the dry film was left in contact with a 50-50 mixture of oleic acid and "Crisco" (hydrogenated vegetable oil) for two hours.

*Hardness.*—Determined by a comparative thumb nail test.

*Flexibility.*—The dry, coated metal panel was bent through a 180° angle and the coating was inspected.

*Color.*—Comparison with a standard scale in which 0 rating corresponds to a water white color, and higher numerals correspond to progressively darker colors.

The evaluation data obtained according to the above-described procedure are summarized in Table II.

Table I
PREPARATION OF PROPYLENE-BUTADIENE DRYING OILS

| Example No. | Feed Composition by Weight | | | Wt. Ratio Butadiene to Propylene | Run Data | | | | Per Cent Conversion | |
|---|---|---|---|---|---|---|---|---|---|---|
| | Propylene (grams) | Butadiene (grams) | Diisobutylene (grams) | | BF₃ Catalyst Added (p. s. i.)[1] | Max. Pressure, p. s. i. | Max. Temp., °C. | Time, Hours | Soluble Product | Insoluble Gel |
| 1 | 720 | 480 | None | 40/60 | 100 | 680 | 85 | 1.25 | 80 | 10 |
| 2 | 720 | 480 | 57.0 | 40/60 | 100 | 460 | 65 | 1.5 | [2]80 | Trace |
| 3 | 150 | 150 | None | 50/50 | 100 | 1,400 | 105 | .5 | 70 | 15 |
| 4 | 830 | 360 | None | 30/70 | 10 | 200 | 38 | 2.0 | 84 | 7 |
| 5 | 720 | 480 | None | 40/60 | 100 | 350 | 70 | 16.0 | 90 | 3 |
| 6 | 720 | 480 | None | 40/60 | 100 | 850 | 95 | 2.0 | | |
| 7 | 600 | 600 | 57.0 | 50/50 | 100 | 600 | 75 | .75 | 90 | 2 |
| 8 | 790 | 360 | 57.0 | 30/70 | 100 | 600 | 60 | 1.25 | [3]80 | Trace |
| 9 | 720 | [4]480 | 57.0 | [4]40/60 | 100 | 350 | 50 | .35 | 60 | 0 |
| 10 | [5]500 | 500 | None | [5]50/50 | 125 | 1,300 | 160 | .4 | 94 | Trace |

[1] Excess pressure in 3-liter reactor.
[2] M. W. 385.
[3] M. W. 325.
[4] Isoprene substituted for butadiene.
[5] n-Butene-2 substituted for propylene.

The products obtained from several of the runs were tested and compared with commercial dehydrated castor oil and alkali-refined linseed oil. For this purpose a film-like coating of the oily materials was applied to flat metal panels, and these coated panels were then either dried in air

Table II
PRODUCT EVALUATION [1]

| Product (Example No.) | Weight Ratio Butadiene Propylene | Panels Air Dried, 24 Hrs. | | | | | Baked Panels (Drier Added [2]) | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | | | | | | | 1 Hr. @ 250° F. | | | | | | 5 Min. @ 400° F. | | | | | | 10 Min. @ 400° F. | | | | | | 20 Min. @ 400° F. | | | | | |
| | | Soap | H₂O | Grease | Comparative Hardness | Flex. | Soap | H₂O | Grease | Comparative Hardness | Flex. | Color | Soap | H₂O | Grease | Comparative Hardness | Flex. | | Soap | H₂O | Grease | Comparative Hardness | Flex. | | Soap | H₂O | Grease | Comparative Hardness | Flex. | |
| 2 | 40/60 + Dimer | 5 | 3 | 9 | 0 | 0 | 1 | 0 | 9 | 0 | 0 | 1 | 0 | 3 | 9 | 0 | 5 | | 1 | 1 | 9 | 0 | 2 | | 0 | 0 | 9 | 0 | 4 | |
| 5 | 40/60 | 9 | 0 | 9 | 0 | 0 | 9 | 0 | 9 | 0 | 0 | 1 | 0 | 0 | 9 | 0 | 5 | | 5 | 0 | 9 | 0 | 4 | | 0 | 0 | 9 | 0 | 6 | |
| 6 | 40/60 | 9 | 5 | 9 | 0 | 0 | 9 | 0 | 9 | 0 | 0 | 2 | 0 | 0 | 9 | 0 | 4 | | 0 | 0 | 9 | 0 | 5 | | 0 | 0 | 9 | 0 | 5 | |
| 7 | 50/50 + Dimer | 4 | 2 | 9 | 0 | 5 | 3 | 0 | 9 | 0 | 4 | 1 | 0 | 2 | 9 | 0 | 4 | | 4 | 1 | 9 | 2 | 3 | | 0 | 0 | 9 | 0 | 5 | |
| 8 | 30/70 + Dimer | 9 | 5 | 9 | 2 | 0 | 3 | 0 | 9 | 1 | 0 | 1 | 3 | 4 | 9 | 0 | 0 | | 2 | 3 | 9 | 1 | 0 | | 0 | 1 | 9 | 0 | 3 | |
| | | Film dry on surface only | | | | | | | | | | | | | | | | | | | | | | | | | | | | |
| 9 | 40 Isoprene 60 Prop. | 6 | 6 | 6 | 9 | 0 | 1 | 0 | 9 | 0 | 6 | 2 | | | | | | | | | | | | | | | | | | |
| | | | | | | | 2 Hr. @ 250° F.[3] | | | | | | | | | | | | | | | | | | | | | | | |
| Dehydrated Castor Oil | | 9 | 0 | 5 | 7 | 0 | 9 | 0 | 3 | 5 | 0 | 4 | Carbonized | | | | | | Carbonized | | | | | | Carbonized | | | | | |
| Alkali Refined Linseed Oil | | 9 | 3 | 5 | 7 | 0 | 9 | 0 | 3 | 5 | 0 | 6 | Carbonized | | | | | | Carbonized | | | | | | Carbonized | | | | | |

[1] Rating: 0=unaffected, 9=failure.
[2] Drier: 0.5% Pb + 0.05% Mn, added as naphthenates.
[3] Both the linseed oil and the castor oil were incompletely dried and remained sticky after 1 hr. @ 250° F., wherefore it was necessary to dry them for 2 hours.

Analysis of the test data of Table II shows that the drying oils prepared according to the invention of applicants have excellent soap resistance, especially when the monomeric mixture contained diisobutylene. Water resistance of the oven-baked films was equal to that of castor oil and of linseed oil. Grease resistance was poor as expected. However, all but the isoprene copolymer film were characterized by a superior drying rate, and all had a far superior color and heat resistance than the linseed oil or the castor oil when dried at elevated temperatures. Furthermore, the films resulting from the invented drying oils, again with the exception of the isoprene copolymer, were very much harder than similar films prepared from linseed or castor oil, the difference being particularly great for the air-dried samples.

From the above results it is apparent that the novel propylene copolymers possess very desirable characteristics as drying oils. These inexpensive oily polymers when applied to a supporting surface form a clear, water white coating which dries into a tough, transparent, thermosetting film. Such coatings lend themselves to simple drying in air, or can be advantageously oven baked. They dry substantially faster than linseed oil or castor oil, and are much more resistant to higher temperatures. For instance, whereas the oils of natural origin darken substantially at 250° F. and carbonize completely at 400° F., the novel propylene copolymers darken only slightly at 250° F. and withstand 400° F. without detriment, and are therefore especially valuable as a base for white or light colored paints. They have excellent water and soap resistance and are suited wherever high grease resistance is not required.

These enamels are readily modified by the addition of pigments such as lead carbonate, whiting, barytes, lithopone, chrome green, chrome yellow, rouge, the various clays and other coloring pigments which are customary in the making of paints, lacquers, varnishes and enamels. Similarly the various lakes may be used and also the various oil soluble dyes. The resulting baked enamels are noticeably more brilliant in color than similar enamels prepared from the drying oils of natural origin, because the drying oil base of the latter ones darkens substantially, especially when oven baked. The oily polymer can be extended or mixed with solvents or other synthetic or natural drying oils such as linseed oil, tung oil, dehydrated castor oil, synthetic drying oils obtained by sodium or emulsion polymerization of butadiene, etc. Its drying characteristics may be modified by incorporation of suitable drying agents such as naphthenates of lead and/or manganese. Furthermore, it may also be mixed with other surface coating resins commonly used in the coating art, such as rosin, phenol-formaldehyde resins, resinous low-temperature polymers of butadiene and isobutylene, etc.

Having described but a limited number of embodiments of our invention, it is possible to produce still other embodiments without departing from the inventive concept herein disclosed and defined by the appended claims.

We claim:

1. In a polymerization process for producing light-colored drying oils, the improvement which consists of making up a polymerization feed comprising mixtures of 70 to 50 weight per cent of propylene monomer and 30 to 50 weight per cent of a conjugated diolefin having 4 to 6 carbon atoms per molecule, and polymerizing the resulting feed at a temperature between $+50°$ C. and $+110°$ C. under a pressure of 50 to 600 lbs./sq. in. in the presence of gaseous boron fluoride, whereby a light-colored, hydrocarbon-soluble drying oil is obtained.

2. A process according to claim 1 wherein the feed consists of a mixture of about 60 weight per cent of propylene with about 40 weight per cent of butadiene, and wherein the temperature of the polymerization step is between $+50°$ C. and $+110°$ C.

3. An oily, light-colored olefinic copolymer prepared by copolymerization of about 60 weight per cent propylene and about 40 weight per cent butadiene at a temperature between $+50°$ C. and $+110°$ C. under a pressure of 50 to 600 lbs./sq. in. in the presence of anhydrous, gaseous boron fluoride and being characterized by solubility in hydrocarbon solvents to the extent of at least 97% insolubility in water, and ability to yield a tough, transparent, thermosetting coating when spread as a film and subjected to drying.

4. A polymerization process comprising in combination the steps of mixing 50 to 70 parts by weight of propylene with 50 to 30 parts by weight of a conjugated diolefin having 4 to 6 carbon atoms per molecule and ½ to 10 parts by weight of a third hydrocarbon component selected from the class consisting of diisobutylene and triisobutylene, and polymerizing the mixture at a temperature between 50° C. and 100° C. and under a pressure of 50 to 600 lbs./sq. in. in the presence of gaseous boron fluoride, to produce a light colored, liquid, thermosetting polymer.

5. A polymerization process comprising in combination the steps of mixing 50 to 70 parts of propylene with 50 to 30 parts of a conjugated diolefin of 4 to 6 carbon atoms and about ½ to 10 parts of a dimer of isobutylene, and polymerizing the mixture at about 65° C. under a pressure of 200 to 600 lbs./sq. in. within a period of less than two hours in the presence of anhydrous boron fluoride, to produce a light colored liquid polymer possessing a molecular weight below 1000.

6. A process according to claim 4 in which the conjugated diolefin is butadiene-1,3.

7. A process according to claim 5 in which the conjugated diolefin is 2-methyl butadiene-1,3.

8. In a method for producing a reactive copolymer of a conjugated diolefin of 4 to 6 carbon atoms and propylene, the improvement comprising admixing 0.5 to 10% of diisobutylene to a mixture of 30 to 50 weight percent of a conjugated diolefin having from 4 to 6 carbon atoms and of 70 to 50 weight percent of propylene, and polymerizing the resulting mixture at a temperature between about $+50°$ C. and $+110°$ C. under pressure of 50 to 600 lbs./sq. inch in the presence of anhydrous boron trifluoride to produce a light colored oily product which is substantially completely soluble in hydrocarbon solvents.

9. An oily substantially water white olefinic copolymer of 50 to 70 parts of interpolymerized propylene, 50 to 30 parts of an interpolymerized conjugated $C_4$ to $C_6$ diolefin and between 0.5 to 10 parts of isobutylene dimer, said copolymer being prepared by the process defined in claim 5 and being characterized by a molecular weight below 1000, substantially complete solubility in hydrocarbon solvents and by its ability to yield a hard, non-yellowing, thermosetting, soap resistant film on baking at temperatures below about 400° F.

GEORGE F. LEYONMARK.
PAUL E. HARDY.

REFERENCES CITED

The following references are of record in the file of this patent:

UNITED STATES PATENTS

| Number | Name | Date |
|---|---|---|
| 1,989,425 | Otto et al. | June 29, 1935 |
| 2,092,889 | Mikeska et al. | Sept. 14, 1937 |
| 2,109,772 | Frohlich | Mar. 1, 1938 |
| 2,151,382 | Harmon | Mar. 21, 1939 |
| 2,253,323 | Christman | Aug. 19, 1941 |
| 2,301,668 | Pier et al. | Nov. 10, 1942 |
| 2,345,574 | Burk | Apr. 4, 1944 |
| 2,374,242 | Soday | Apr. 24, 1945 |
| 2,442,644 | Elwell et al. | June 1, 1948 |

FOREIGN PATENTS

| Number | Country | Date |
|---|---|---|
| 264,925 | Germany | Sept. 23, 1913 |